(12) United States Patent
Akiba et al.

(10) Patent No.: US 7,595,836 B2
(45) Date of Patent: Sep. 29, 2009

(54) DRIVE CONTROLLER

(75) Inventors: Makoto Akiba, Saitama (JP); Hideo Yoshida, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 360 days.

(21) Appl. No.: 11/727,332

(22) Filed: Mar. 26, 2007

(65) Prior Publication Data

US 2007/0222886 A1 Sep. 27, 2007

(30) Foreign Application Priority Data

Mar. 27, 2006 (JP) .................... P2006-085946

(51) Int. Cl.
*G03B 13/00* (2006.01)
*H04N 5/232* (2006.01)
(52) U.S. Cl. ...................... 348/345; 348/357
(58) Field of Classification Search ............... 348/345, 348/357; 359/819, 823
See application file for complete search history.

(56) References Cited

U.S. PATENT DOCUMENTS

| 4,841,370 | A | | 6/1989 | Murashima et al. | |
|---|---|---|---|---|---|
| 4,903,134 | A | | 2/1990 | Murashima et al. | |
| 5,225,941 | A | * | 7/1993 | Saito et al. | 359/824 |
| 6,249,093 | B1 | * | 6/2001 | Takahata et al. | 318/129 |
| 6,930,720 | B2 | * | 8/2005 | Ohkawara | 348/345 |
| 7,209,175 | B1 | * | 4/2007 | Kurokawa et al. | 348/345 |
| 2004/0212721 | A1 | * | 10/2004 | Watanabe | 348/345 |
| 2005/0270408 | A1 | * | 12/2005 | Kwon et al. | 348/345 |

FOREIGN PATENT DOCUMENTS

| JP | 2633066 B2 | 4/1997 |
|---|---|---|
| JP | 11-356070 A | 12/1999 |
| KR | 1993-0003570 B1 | 5/1993 |

* cited by examiner

*Primary Examiner*—Jason Chan
*Assistant Examiner*—Pritham Prabhakher
(74) *Attorney, Agent, or Firm*—Birch, Stewart, Kolasch & Birch, LLP

(57) ABSTRACT

A drive controller is provided and controls the supply of driving pulses in such a way as to make an extension speed and a contraction speed along a direction of a piezoelectric element differ to cause the piezoelectric element to extend and contract, so as to move a lens, the drive controller including an AF evaluation value-measuring device for measuring an AF evaluation value in a driving direction of the lens, a return pulse number-calculating device for calculating a maximum value-presuming position so as to calculate a return pulse number, a reverse movement-control device for returning the lens in a reverse direction, a threshold calculating device for calculating an evaluation value threshold, a measurement and determination means for remeasuring the AF evaluation value and determining whether or not an AF re-evaluation value is equal to or larger than the evaluation value threshold, and an AF evaluation value remeasuring device for remeasuring an AF evaluation value in the reverse direction of the lens.

6 Claims, 7 Drawing Sheets

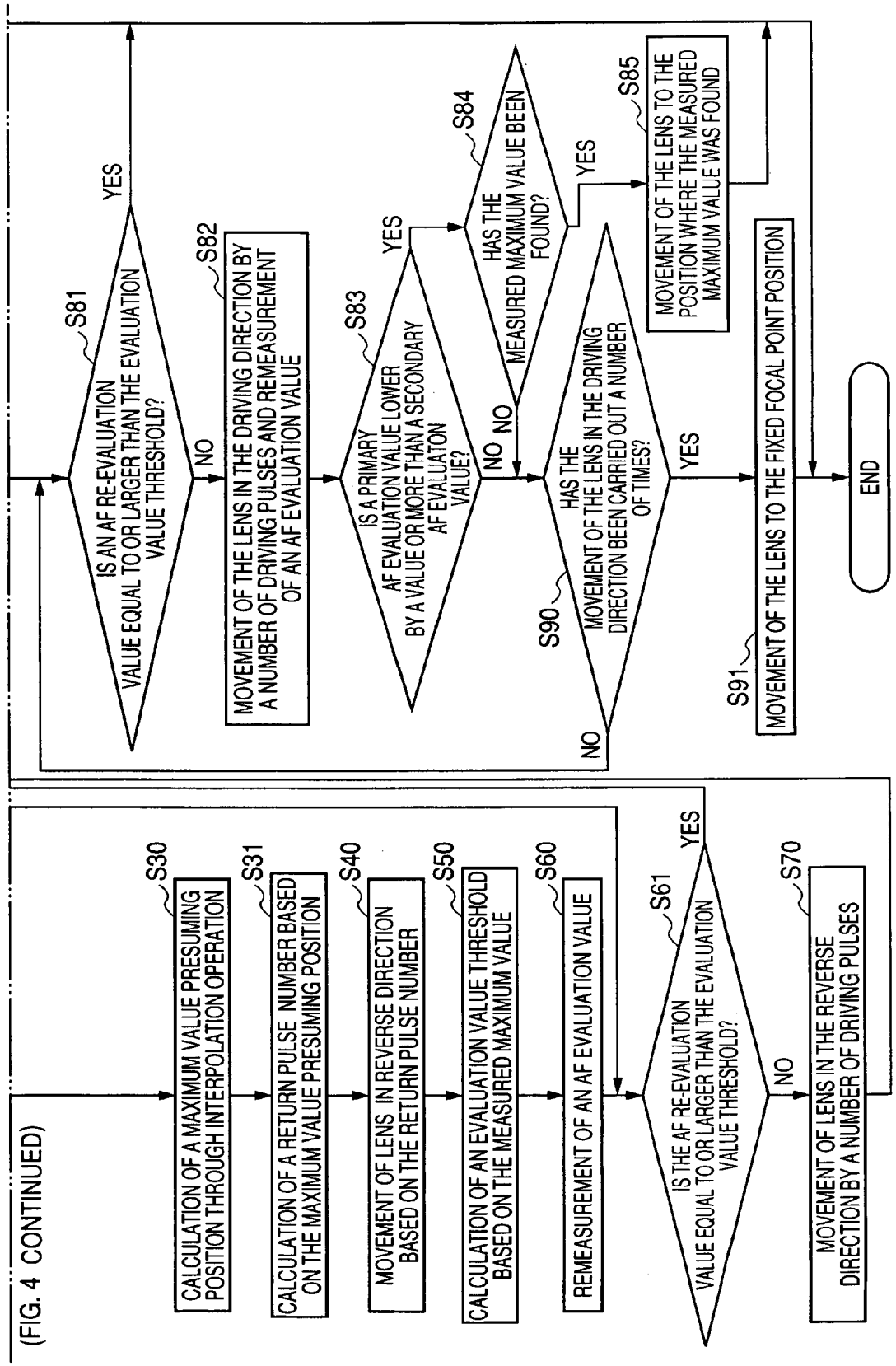

DRIVE CONTROLLER

BACKGROUND OF THE INVENTION

1. Field of the Invention

The present invention relates to a drive controller which utilizes an electromechanical transducer.

2. Description of Related Art

In the related art, various actuators which utilize a piezoelectric element have been proposed. For example, an actuator which utilizes a piezoelectric element is proposed for driving a lens of a camera for focusing (refer to Japanese Patent Publication No. 2633066). In the actuator, it is general that the supply of driving pulses to the piezoelectric element is controlled in such a way as to cause an extension speed and a contraction speed along a direction of the piezoelectric element to differ, so as to cause the piezoelectric element to extend and contract, whereby a lens driving shaft member is caused to extend and contract in the direction, so that a lens which is in frictional engagement with the shaft member is caused to move minutely along the direction.

In the actuator, however, since the shaft member is caused to extend and contract along the direction by causing the piezoelectric element to extend and contract in such a way that the extension speed and the contraction speed along the direction of the piezoelectric element are caused to differ, so as to move minutely the lens which is in frictional engagement with the shaft member, it has been difficult to move the lens by a distance proportional to the number of driving pulses.

A technique is disclosed in JP-A-11-356070 in which in order to increase the accuracy with which a lens is driven for focusing, a moving amount of the lens is detected to obtain a moving speed of the lens, and a time to stop the supply of driving pluses for driving the lens is controlled so that the moving speed of the lens becomes a predetermined target speed.

Incidentally, there is known a technique in which while moving a lens in a direction by a number of driving pulses for each movement, an AF evaluation value (for example, a contrast value) is measured which is obtained from an image photographed via the lens to obtain a position where the AF evaluation value becomes maximum, so that the lens is moved to the position to be in focus. In this technique, since measuring points of AF evaluation values are spaced apart from each other at intervals, in order to implement more accurate focusing, an operation is carried out in which the lens is returned in the reverse direction to a peak position of the AF evaluation value after the measurement of AF values (AF search).

However, even in JP-A-11-356070, nothing is mentioned as to a control for the return operation. In addition, the nature of the piezoelectric element changes while the operation is repeated of returning the lens in the reverse direction to the peak position of the AF evaluation value, whereby the number of pulses which is required to actually move the lens by a specified distance is changed, this making difficult for the AF search to be carried out with higher accuracy.

SUMMARY OF THE INVENTION

An object of an illustrative, non-limiting embodiment of the present invention is to provide a drive controller which can realize an AF search with higher accuracy even in the event that the moving operation of the lens is repeated, which is attributed to the usage of the piezoelectric element.

According to one aspect of the invention there is provided A drive controller comprising: an electromechanical transducer that extends and contracts along a direction; a drive member fixed to one end of the electromechanical transducer in the direction; and a driving pulse control unit that controls a supply of a driving pulse to the electromechanical transducer, the driving pulse control unit causing the drive member to extend and contract along the direction by controlling the supply of driving pulse in such a way as to make an extension speed and a contraction speed along the direction of the electromechanical transducer differ to cause the electromechanical transducer to extend and contract, so as to move a driven member along the direction, the driven member being made to be in frictional engagement with the drive member and including a lens. The driving pulse control unit includes: a AF evaluation value-measuring section that, while the driven member is moved by a number of driving pulses in a driving direction of the driven member during a focusing operation of the lens, measures an AF evaluation value obtained from an image photographed via the lens for each movement of the driven member; a return pulse number-calculating section that calculates a maximum value-presuming position, which is presumed to be a position where a maximum value of the AF evaluation value is obtained, based on a measured maximum value obtained by the AF evaluation value-measuring section and that calculates a return pulse number to return the driven member to the maximum value-presuming position; a reverse movement-control section that controls the supply of driving pulses in such a way as to return the driven member in a reverse direction based on the return pulse number; a threshold calculating section that calculates an evaluation value threshold specifying whether to move the driven member to a preset fixed focus position, based on the measured maximum value; a measurement and determination section that remeasures an AF evaluation value at a position where the driven member stops after the driven member is returned by the reverse movement-control section and that determines whether the AF evaluation value remeasured is equal to or larger than the evaluation value threshold; and an AF evaluation value-remeasuring section that, while the driven member is moved in the reverse direction by a number of driving pulses, remeasures an AF evaluation value for each movement of the driven member until the measurement and determination section determines the AF evaluation value remeasured to be equal to or larger than the evaluation value threshold.

Note that the "AF evaluation value" means, for example, an evaluation value such as a contrast value obtained from an image photographed via the lens which is used in a focusing operation of the lens, and it is evaluated that as the AF value increases, the degree of being in focus increases.

According to the drive controller in one aspect of the invention, firstly, the driving pulse control unit calculates the maximum value-presuming position based on the measured maximum value obtained in the measurement of AF evaluation value, furthermore, calculates the return pulse number which is required to return the driven member to the maximum value-presuming position and controls the supply of driving pulses based on the return pulse number so calculated in such a way as to return the driven member in the reverse direction. In addition, the driving pulse control unit calculates the evaluation value threshold based on the measured maximum value. Next, the driving pulse control unit remeasures an AF evaluation value at the position where the driven member stops after the driven member has been returned and furthermore, determines whether or not the AF re-evaluation value obtained in the remeasurement is equal to or larger than the calculated evaluation value threshold. Then, the driving pulse control unit remeasures, while moving the driven member in the reverse direction by the predetermined number of driving pulses for each movement, an AF evaluation value each movement until the AF re-evaluation value is determined to be equal to or larger than the evaluation value threshold.

Thus, in one aspect of the invention, the maximum value-presuming position is calculated based on the measured maximum value, the driven member is returned to the maximum value-presuming position, the evaluation value threshold is calculated based on the measured maximum value, and the AF evaluation value is remeasured until the AF re-evaluation value is determined to be equal to or larger than the evaluation value threshold. By adopting this configuration, even in the event that the number of pulses which is required to actually move the lens by a specified distance is changed due to the nature of the piezoelectric element being changed by the repetition of moving operation of the lens which is attributed to the usage of the piezoelectric element, since the AF evaluation value is remeasured at the maximum value-presuming position or in the vicinity thereof, an AF search with higher accuracy can be realized.

In the drive controller, when a primary AF evaluation value obtained by the AF evaluation-remeasuring section is lower, by a value or more, than a secondary AF evaluation value obtained at a timing of an immediately prior measurement at a position where the primary AF evaluation value is obtained, while the driven member is moved in the driving direction by a number of driving pulses, the AF evaluation value-remeasuring section may remeasure an AF evaluation value for each movement of the driven member until the AF evaluation value remeasured is determined to be equal to or more than the evaluation value threshold.

By this configuration, in the event that the primary AF evaluation value is lower by the predetermined value or more than the secondary AF evaluation value, the AF evaluation value remeasuring section also preferably remeasures, while moving the driven member in the driving direction by a predetermined number of driving pulses for each movement, an AF value for each movement until the AF re-evaluation value is determined to be equal to or more than the evaluation value threshold. Because of this, in the even that the primary AF evaluation value becomes lower by the predetermined value or more than the secondary AF evaluation value, since the possibility that the driven member can be moved to a position where a higher AF evaluation value is measured is low even though the driven member which is being moved in the reverse direction is left so moving, the moving direction of the driven member is changed, and the AF evaluation value can be remeasured while the driven member is kept moving in the driving direction. As a result, the driven member can be moved to a position where a higher AF evaluation value is measured with less delay. In addition, even though noise of less than a predetermined value or the like is generated when the AF evaluation value is measured, irrespective of the generation of the noise or the like, the driven member can be kept moving to the position where a higher AF evaluation value can be measured until the AF evaluation value is determined to be equal to or larger than the evaluation value threshold.

The threshold calculating section may calculate the evaluation value threshold from the measured maximum value, an immediately prior-evaluation value obtained at a timing of an immediately prior measurement at a position where the measured maximum value was obtained and an immediately after-evaluation value obtained at a timing of an immediately after measurement at the position where the measured maximum value was obtained, based on the measured maximum value and one of the immediately prior-evaluation value and the immediately after-evaluation value, which is not smaller than the other. Note that the evaluation value of the immediately prior-evaluation value and the immediately after-evaluation value which is not smaller than the other means the evaluation value of the immediately prior-evaluation value and the immediately after-evaluation value which is larger than the other, and when the two evaluation values are equal, the relevant value means these equal values.

By this configuration, the driving pulse control unit calculates the evaluation value threshold based on the measured maximum value and one of the immediately prior-evaluation value and the immediately after-evaluation value which is not smaller than the other. Next, the driving pulse control unit remeasures, while moving the driven member in the reverse direction by the number of driving pulses for each movement, an AF evaluation value each movement until the AF re-evaluation value is determined to be equal to or larger than the evaluation threshold value. Here, the evaluation value threshold so calculated is a value which is based on not only the measured maximum value but also one of the immediately prior-evaluation value and the immediately after-evaluation value which is not smaller than the other. As a result, since the accuracy of the evaluation value threshold can be increased further, thereby making it possible to realize an AF search with higher accuracy.

The threshold measuring section may calculate an interpolated evaluation value that is presumed to be a maximum value of the AF evaluation value through an interpolation operation based on the measured maximum value, the immediately prior-evaluation value and the immediately after-evaluation value, and the threshold measuring section calculates the evaluation threshold based on the interpolated evaluation value.

By this configuration, the driving pulse control unit calculates the interpolated evaluation value from the measured maximum value, the immediately prior-evaluation value and the immediately after-evaluation value through interpolation operation and furthermore calculates the evaluation value threshold based on the interpolated evaluation value. Here, since the calculated evaluation value threshold is not a value which is based on only the measured maximum value and one of the immediately prior-evaluation value and the immediately after-evaluation value but is a value which is based on the interpolated evaluation value which is calculated from the measured maximum value, the immediately prior-evaluation value and the immediately after-evaluation value through interpolation operation, an AF search with higher accuracy can be realized.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, even in the event that the moving operation of the lens is repeated due to the usage of the piezoelectric element, an AF search with higher accuracy can be realized.

Hereinafter, an embodiment of the invention will be described by reference to FIGS. 1 to 6.

(Schematic Configuration of Drive Controller)

Figure 1:
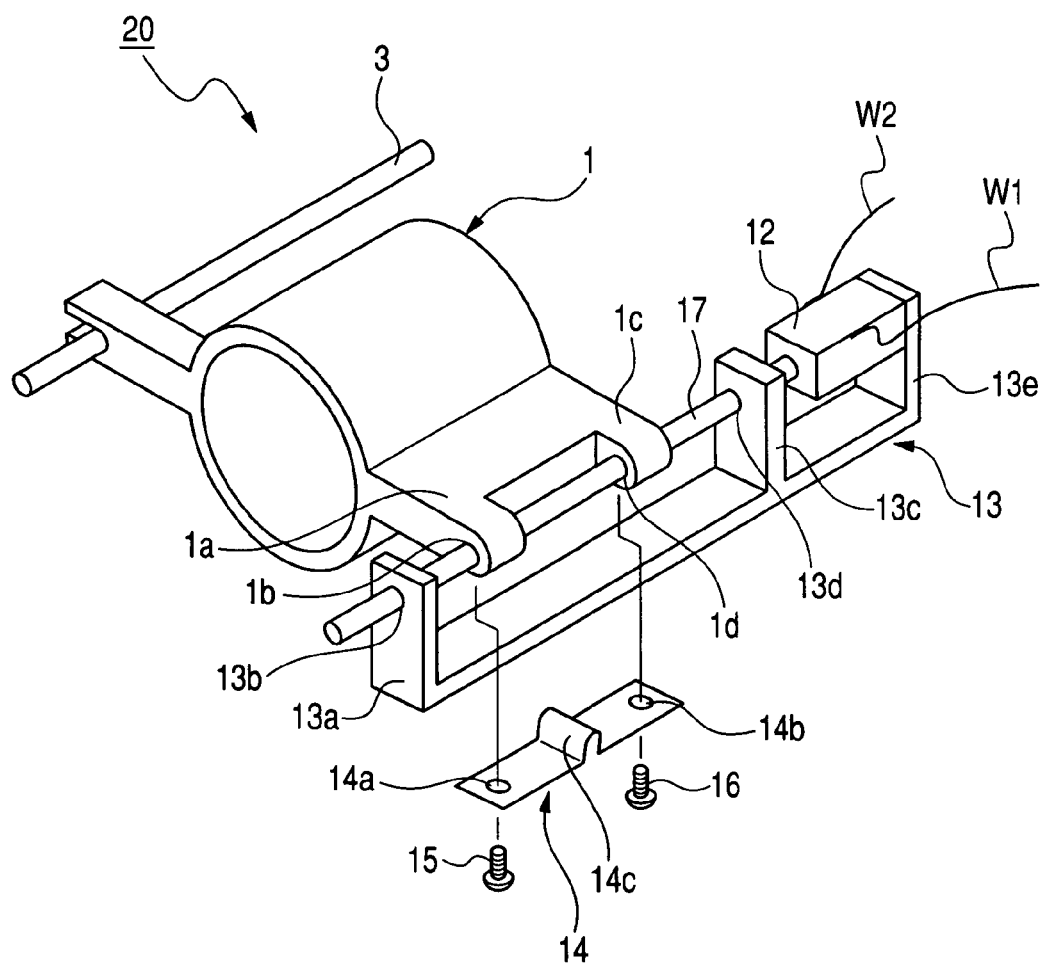
FIG. 1 is an exploded perspective view showing a drive controller according to an exemplary embodiment of the invention.

FIG. 1 shows an exploded perspective view of an example of a drive controller 20 according to an exemplary embodiment of the invention. In FIG. 1, the drive controller 20 is made to include a lens barrel 1 which incorporates therein a lens 21 (FIG. 2) as a driven member and a guide bar 3 which not only supports the lens barrel 1 bus also guides the lens barrel 1 along the direction of an optical axis of the lens 21. A drive rod 17 adapted to double as a lens barrel support member which not only supports the lens barrel 1 but also moves the lens barrel 1 in an axial direction is inserted into a hole 1b in a left-hand side projecting portion 1a and a hole 1d in a right-hand side projecting portion 1c of the lens barrel 1, and the drive rod 17 which doubles as the lens barrel support member (hereinafter, referred briefly to the "drive rod") is axially movably inserted into a hole 13b in a primary erect portion 13a and a hole 13d in a secondary erect portion 13c which are formed on a drive rod support member 13. In addition, the drive rod 17 projects further rearwards of the secondary erect portion 13c of the drive rod support member 13 so as to be fixed to a front end of a piezoelectric element 12 which is secured to a third erect portion 13e of the drive rod support member 13 at a rear end of thereof.

Vertical threaded holes are formed in lower surfaces of the projecting portions 1a and 1c of the lens barrel 1, and rectangular leaf spring 14, which has unloaded holes 14a and 14b formed at ends thereof in such a manner as to correspond the positions of the threaded holes, respectively, is mounted on the lower surfaces of the projecting portions 1a and 1c with machine screws 15 and 16 in parallel with the drive rod 17. A bent portion 14c is formed at the center of the leaf spring 14 in such a manner as to project upwards, and this bent portion 14 is brought into press contact with a lower surface of the drive rod 17 in an intermediate position between the projecting portions 1a and 1c. Because of this, the drive rod 17 is biased upwards in both the hole 1b of the projecting portion 1a and the hole 1d of the projecting portion 1c, whereby an upper outer circumferential surface of the drive rod 17 is brought into press contact with upper inner circumferential surfaces of the holes 1b and 1d by virtue of the spring force of the leaf spring 14. Consequently, when an axial force which is equal to or smaller than a frictional force between the holes 1b and 1b and the drive rod 17 and a frictional force between the bend portion 14c and the drive rod 17 is applied to the drive rod 17, the lens barrel 1 and the drive rod 17 move as a single unit, whereas when an axial force which is larger than those frictional forces is applied to the drive rod 17, only the drive rod 17 is allowed to move in the axial direction. Note that w1 and w2 denote lead wires for feeding the piezoelectric element 12.

Next, the function of the leaf spring 14 will be described which brings the drive rod 17 and the lens barrel 1 into frictional engagement with each other. In order to prevent the application of elastic force by the leaf spring 14 in a direction in which the lens barrel 1 is displaced, the elastic force of the leaf spring 14 is made to be applied substantially vertically to the drive rod 17. Furthermore, when the leaf spring 14 is elastically deformed in the direction of extension and contraction of the piezoelectric element 12 by virtue of extension and contraction of the piezoelectric element 12, the frictional force between the drive rod 17 and the lens barrel 1 changes, and furthermore, the elastic force is applied in the displacement direction of the lens barrel 1, whereby the displacement of the lens barrel 1 becomes unstable. To prevent this, the leaf spring 14 has a flat surface portion which is parallel to the direction of extension and contraction of the piezoelectric element 12 so as to have a large rigidity in this direction.

(Functional Configuration of Drive Controller)

Figure 2:
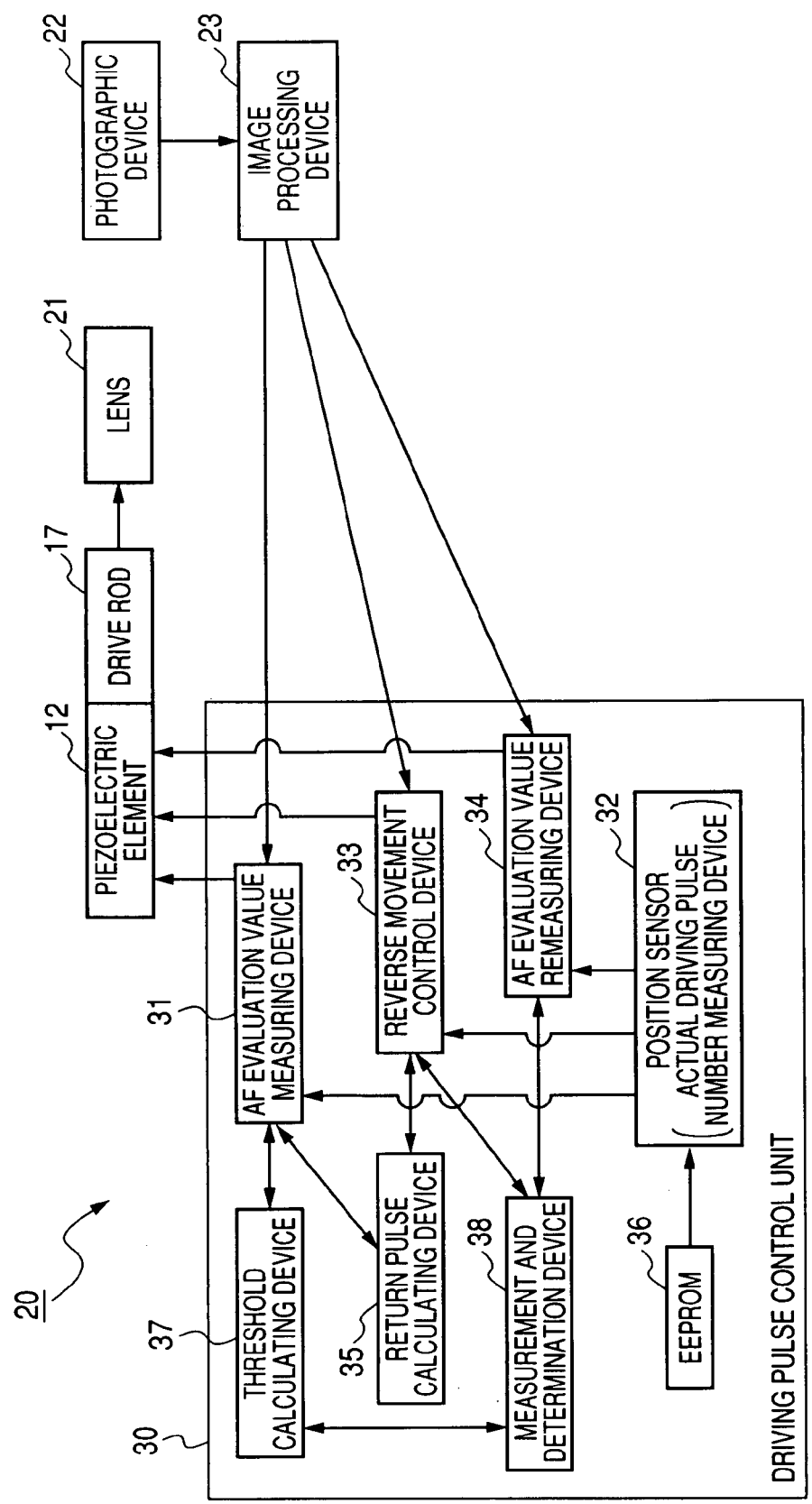
FIG. 2 is a functional block diagram in relation to the drive controller.

FIG. 2 shows a functional block diagram in relation to the drive controller 20. As is shown in FIG. 2, the drive controller 20 includes the lens 21 which is incorporated in the lens barrel 1 shown in FIG. 1, a photographic device 22 for photographing an image via the lens 21, an image processing device 23 for applying an image processing to image data obtained through photographing by the photographic device 22 and outputting image data resulting after the relevant image processing has been carried out to an AF evaluation value measuring device 31, a reverse movement control device 33 and an AF evaluation value remeasuring device 34, which will be described later on, the drive rod 17 (the drive member) for adjusting the position of the lens 21 along the optical axis direction, the piezoelectric element 12 (the electromechanical transducer) connected to the drive rod 17 and having the function to move the drive rod 17 along the direction of optical axis, and a driving pulse control unit 30 for controlling the supply of driving pulses to the piezoelectric element 12. Among these constituent components, the driving pulse control unit 30 causes the drive rod 17 to extend and contract along the optical axis direction by controlling the supply of driving pulses in such a way as to cause an extension speed and a contraction speed along the optical axis direction of the piezoelectric element 12 to differ from each other to thereby cause the piezoelectric element 12 to extend and contract, so as to move the lens barrel 1 (and the lens 21 incorporated therein) which is made to be in frictional engagement with the drive rod 17 and contain the lens 21 along the optical axis direction in a direction in which the lens barrel 1 approaches a subject (hereinafter, referred to as an "N direction") and in a direction in which the lens barrel 1 moves away from the subject (hereinafter, referred to as an "INF direction").

Figure 3:
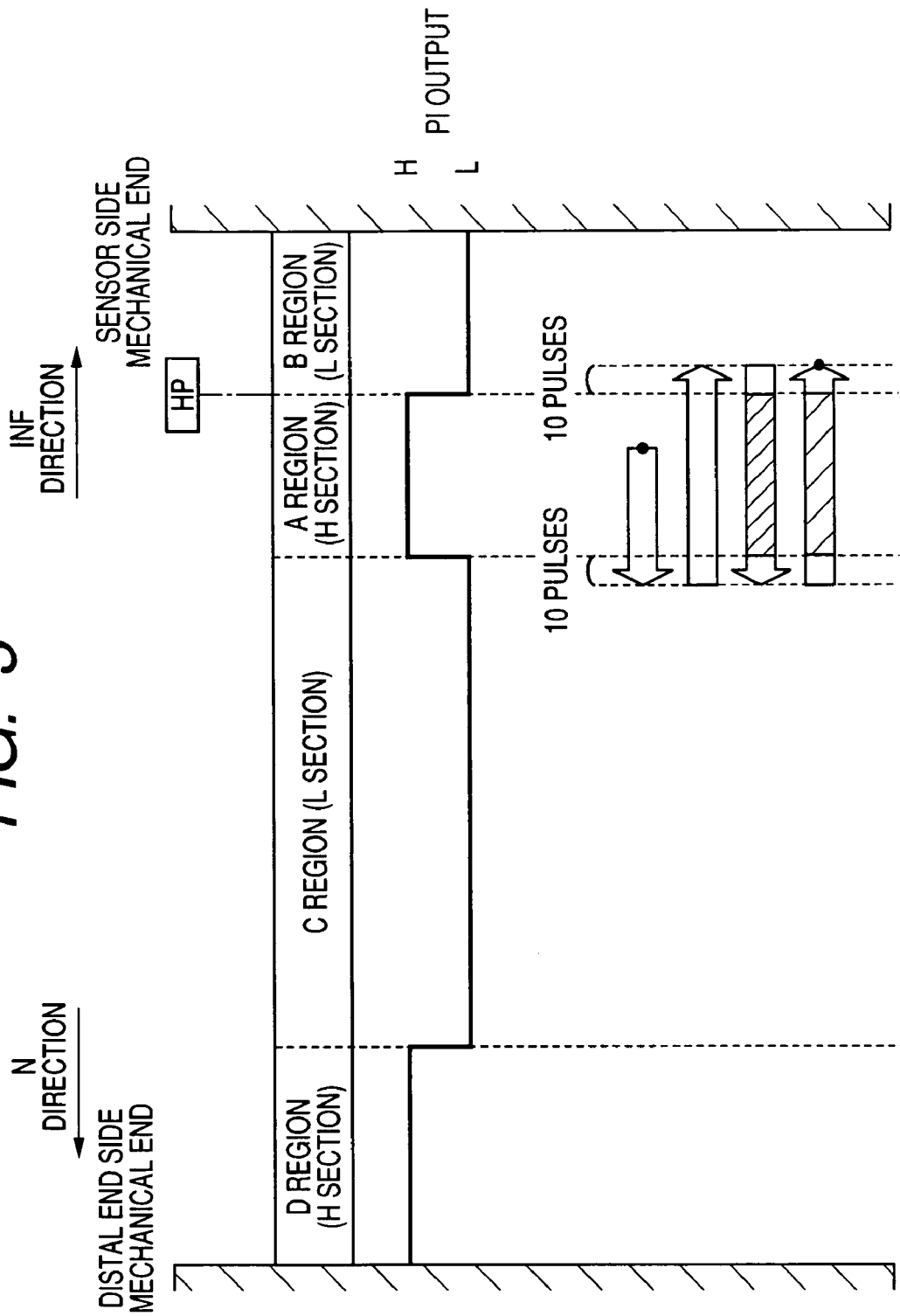
FIG. 3 is a graph showing an output signal from a photo-interrupter incorporated in a position sensor.

In addition, the driving pulse control unit 30 includes a position sensor 32 which includes a conventionally known photointerrupter (not shown) for detecting the position of the lens 21 based on an output signal (hereinafter, referred to as a "PI output") from the photointerrupter. The PI output is represented by a graph which contains a region A and a region D which constitute an H section and a region B and a region C which constitute an L section as is shown in FIG. 3 as an example. The position sensor 32 has a function as an actual driving pulse number measuring device for measuring before the start of a focusing operation of the lens 21 a pulse number (the number of pulses which was required to actually move the lens 21 by a specified distance, hereinafter, referred to as an "actual driving pulse number") which corresponds to the region A in FIG. 3 for each of a driving direction (here, an N direction in FIG. 3) of the lens 21 and a reverse direction (namely, an INF direction) to the driving direction during the focusing operation.

In addition to the aforesaid constituent components, the driving pulse control unit 30 includes, as is shown in FIG. 2, an EEPROM 36, an AF evaluation value measuring device 31, a return pulse number calculating device 35, a reverse movement control device 33, a threshold calculating device 37, a measurement and determination device 38 and an AF evaluation value remeasuring device 34. The EEPROM 36 stores in advance various specified values such as a pulse number, which will be described later on, used by the position sensor 32, a standard pulse number (namely, an N direction standard pulse number $P2_N$ and an INF direction standard pulse number $P2_{INF}$ which are obtained in advance in a normal posture at normal temperatures), a number of times of carrying out AF evaluation value measurement and a value by which an evaluation value threshold, which will be described later on, is to be multiplied.

In addition, the AF evaluation value measuring device 31 measures, while moving the lens 21 in the driving direction (namely, in the N direction) of the lens 21 during the focusing operation of the lens 21 by a number of driving pulses for each movement, an AF evaluation value which is obtained from an image photographed via the lens each movement. The return pulse number calculating device 35 calculates a position where a maximum value of an AF evaluation value is presumed to be obtained (a maximum value-presuming position) based on a maximum value obtained in the measurement (a measured maximum value) and furthermore, calculates a return pulse number which is required to return the lens 21 to the maximum value-presuming position. The reverse movement control device 33 controls the supply of driving pulses in such a way as to return the lens in the reverse direction (namely, in the INF direction) based on the calculated return pulse number. The threshold calculating device 37 calculates a threshold value (an evaluation value threshold) which specifies whether to move the lens 21 to a preset fixed focal point position based on the measured maximum value obtained in the measurement. The measurement and determination device 38 remeasures an AF evaluation value in a position where the lens 21 stops after the lens 21 has been returned by the reverse movement control device 33 and furthermore determines whether or not an AF evaluation value (an AF re-evaluation value) obtained in the remeasurement is equal to or larger than the calculated evaluation value threshold. The AF evaluation value remeasuring device 34 remeasures, while moving the lens 21 in the reverse direction (namely, in the INF direction) by a number of driving pulses for each movement, an AF evaluation value each movement until the AF re-evaluation value is determined to be equal to or larger than the evaluation threshold value.

In addition, in the event that a primary AF evaluation value (the primary AF evaluation value) obtained in the measurement is lower, by a value or more, than a secondary AF evaluation value (the secondary AF evaluation value) obtained at a timing of an immediately prior measurement at a position where the primary AF evaluation value was obtained, the AF evaluation value remeasuring device 34 remeasures, while moving the lens 21 in the driving direction (namely, in the N direction) by a number of driving pulses for each movement, an AF evaluation value each movement until the AF re-evaluation value is determined to be equal to or larger than the evaluation threshold value.

Note that the threshold calculating device 37 may calculate the evaluation value threshold from the measured maximum value obtained in the measurement, an immediately prior-evaluation value obtained at a timing of an immediately prior-measurement at a position where the measured maximum value was obtained and an immediately after-evaluation value obtained at a timing of an immediately after measurement at the position where the measured maximum value was obtained based on the measured maximum value and one of the immediately prior-evaluation value and the immediately after-evaluation value which is not smaller than the other. Note that the evaluation value of the immediately prior-evaluation value and the immediately after-evaluation value which is not smaller than the other means the evaluation value of the immediately prior-evaluation value and the immediately after-evaluation value which is larger than the other, and when the two evaluation values are equal, the relevant value means these equal values.

In addition, the threshold calculating device 37 may calculate an interpolated evaluation value which is presumed to be a maximum value of an AF evaluation value from the measured maximum value obtained in the measurement, the immediately prior-evaluation value and the immediately after-evaluation value through a known interpolation operation, and furthermore, the threshold calculating device 37 may calculate the evaluation value threshold based on the interpolated evaluation value so calculated.

(Processing Operation in Drive Controller)

Figure 4A:
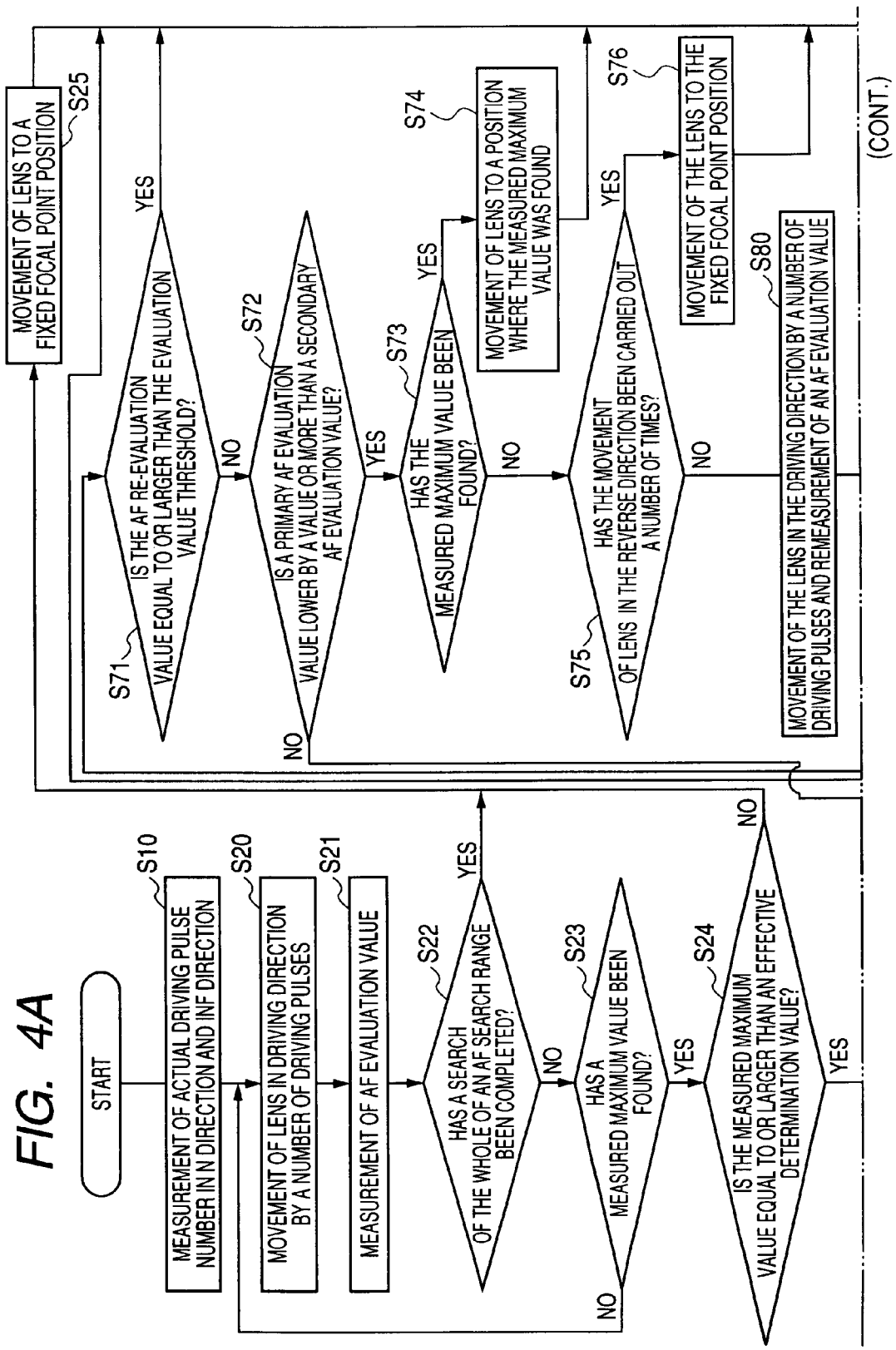
FIG. 4 is a flowchart showing the operation of processes in the drive controller.

Hereinafter, a processing operation in the drive controller 20 will be described. FIG. 4 illustrates a basic processing operation. As is shown in FIG. 4, firstly, in step S10, before the start of a focusing operation of the lens 21, the position sensor 32 measures an actual driving pulse number which corresponds to the region A in FIG. 3 for each of the N direction and the INF direction. Namely, the position sensor 32 firstly measures an actual driving pulse number with respect to the region A in the N direction and next measures an actual driving pulse number with respect to the region A in the INF direction.

To be specific, as is shown in FIG. 3, in the event that a measuring position to be measured by the position sensor 32 at the point in time corresponds to a position within the region A in the PI output, the driving pulse control unit 30 starts a supply of driving pulses to the piezoelectric element 12 in such a way as to move the lens 21 in the N direction, and when the position sensor 32 detects a lagging edge (a switching from the region A to the region C) from H to L in the PI output, the supply of driving pulses is stopped at a point in time where only a number of driving pulses (for example, 10 pulses) have been supplied from the position where the lagging edge was detected. Thereafter, the driving pulse control unit 30 starts the supply of driving pulses to the piezoelectric element 12 in such a way as to move the lens 21 in the INF direction, and when the position sensor 32 detects a lagging edge (a switching from the region A to the region B) from H to L in the PI output, the supply of driving pulses is stopped at a point in time where only a number of driving pulses (for example, 10 pulses) have been supplied from the position where the lagging edge was detected. Next, the driving pulse control unit 30 starts the supply of driving pulses to the piezoelectric element 12 in such a way as to move the lens 21 in the N direction, and the position sensor 32 starts counting the number of actual driving pulses at a point in time where a building up (a switching from the region B to the region A) from L to H in the PI output is detected and thereafter, finishes counting the number of actual driving pulses at a point in time where a lagging edge (a switching from the region A to the region C) from H to L in the PI output is detected. In this way, the actual driving pulse number $P1_N$ in the N direction is measured. Similarly, after the driving pulse control unit 30 has started the supply of driving pulses to the piezoelectric element 12 in such a way as to move the lens 21 in the INF direction, the position sensor 32 starts counting the number of actual driving pulses at a point in time where a building up (a switching from the region C to the region A) from L to H in the PI output is detected and thereafter, finishes counting the number of actual driving pulses at a point in time where a lagging edge (a switching from the area A to the area B) from H to L in the PI output. In this way, the actual driving pulse number $P1_{INF}$ in the INF direction is measured.

In FIG. 4, in the following step S20, the AF evaluation value measuring device 31 moves the lens 21 in the driving direction (that is, in the N direction) of the lens 21 by a number of driving pulses and measures an AF evaluation value in the following step S21. When the lens 21 is moved in the N direction like this, an N direction correction coefficient is used which is calculated by dividing the actual driving pulse number $P1_N$ in the N direction by the N direction standard pulse number $P2_N$ stored in the EEPROM 36. Then, in the following step S22, the position sensor 32 determines whether or not the search of the whole of the AF search range has been completed at this point in time. If the search of the whole of the range is determined to have been completed, the lens 21 is moved to a fixed focal point position as an error in which the measured maximum value could not be found (step S25), and the series of processes ends (END). When the lens 21 is moved in the N direction, the aforesaid N direction correction coefficient is used. On the contrary, when the lens 21 is moved in the INF direction, an INF direction correction coefficient is used which is calculated by dividing the actual driving pulse number $P1_{INF}$ in the INF direction by the INF direction standard pulse number $P2_{INF}$ stored in the EEPROM 36. In this way, by calculating and using the respective correction coefficients in the N and INF directions, the lens 21 can be moved with better accuracy even though the nature of the piezoelectric element 12 changes while the moving operation of the lens 21 is repeated.

On the other hand, in step S22, if the search of the whole of the range is determined not to have been completed, in the following step S23, the AF evaluation value measuring device 31 determines whether or not the measured maximum value has been found in the measurement by the AF evaluation value measuring device 31. The measured maximum value means that a maximum value of three or more AF evaluation values obtained in three or more measurements carried out by the AF evaluation value measuring device 31 is a value obtained neither in the first measurement nor in the last measurement. Namely, the measured maximum value means an AF evaluation value that is made to be an in-focus point. In the event that the measured maximum value is not found, that is, in the event that a possibility still exists that a higher AF evaluation value can be obtained by continuing the measurement, the process flow returns to step S20. On the contrary, if the measured maximum value is found, that is, there exists no possibility that a higher AF evaluation value is obtained even though the measurement continues to be carried out, the process flow proceeds to step S24. The time required for the AF search can be shortened by not continuing to search the remaining part of the AF search range at the point in time where the measured maximum value is found in this way.

Next, in step S24, the AF evaluation value measuring device 31 determines whether or not the measured maximum value so obtained is equal to or larger than an effective determination value J. The effective determination value J means a determination value which specifies whether to move the lens 21 to a preset fixed focal point position. In step S24, if the measured maximum value is less than the effective determination value J, as an error in which the effective measured value is not obtained, the lens 21 is moved to the fixed focal point position (step S25), and the series of processes ends (END). When the lens 21 is so moved, the aforesaid correction coefficient is used. On the contrary, in step S24, if the measured maximum value is equal to or more than the effective determination value J, then the process flow proceeds to step S30.

In step S30, the return pulse number calculating device 35 calculates a maximum value-presuming position based on the measured maximum value. Here, the return pulse number calculating device 35 may calculate the maximum value-presuming position from the measured maximum value, an immediately prior-evaluation value and an immediately after-evaluation value through a known interpolation operation. Then, in the following step S31, the return pulse number calculating device 35 calculates a return pulse number which is required to return the lens 21 to the maximum value-presuming position. Then, in the following step S40, the supply of driving pulses is controlled based on the return pulse number so calculated in such a way as to return the lens 21 in the reverse direction (that is, in the INF direction) at high speeds. By this control, the lens 21 is returned to the maximum value-presuming position (or to a position in the vicinity thereof). When the lens 21 is so moved, the aforesaid correction coefficient is used. Then the process flow proceeds to step S50.

In step S50, the threshold calculating device 37 calculates an evaluation value threshold based on the measured maximum value obtained in the way described above (, the immediately prior-evaluation value and the immediately after-evaluation value) through a calculation method (for example, a known interpolation operation) which will be described later on. The evaluation value threshold means a threshold which specifies whether to move the lens 21 to the preset fixed focal point position. Note that the execution order of Steps S40 and S50 may be reversed. Namely, the process may be executed in the order of steps S31, S50, S40. Then, in the following step S60, the measurement and determination device 38 remeasures an AF evaluation value at the position where the lens 21 stopped after the lens 21 had been returned by the reverse movement control device 33 in step S40. Then, in step S61, the measurement and determination device 38 determines whether or not an AF re-evaluation value that is obtained in the additional remeasurement (or a primary AF evaluation value, which will be described later on) is equal to or larger than the evaluation value threshold that was calculated by the threshold calculating device 37. If the AF re-evaluation value is equal to or more than the evaluation value threshold, understanding that a peak position of the AF evaluation value could be identified with higher accuracy, the series of processes ends (END). On the contrary, if the AF re-evaluation value is less than the evaluation value threshold, the process flow proceeds to step S70.

In step S70, the AF evaluation value remeasuring device 34 moves the lens 21 in the reverse direction (that is, in the INF direction) by a number of driving pulses to remeasure an AF evaluation value. When the lens 21 is so moved, the aforesaid correction coefficient is used. Note that the number of driving pulse which is used here is preferably made to be smaller than the number of driving pulses in the previous step S20. Then, in step S71, the measurement and determination device 38 determines whether or not an AF re-evaluation value that is obtained in the additional remeasurement is equal to or larger than the evaluation value threshold that was calculated by the threshold calculating device 37. If the AF re-evaluation value is equal to or more than the evaluation value threshold, understanding that a peak position of the AF evaluation value could be identified with higher accuracy, the series of processes ends (END). On the contrary, if the AF re-evaluation value is less than the evaluation value threshold, the process flow proceeds to step S72.

In step S72, the AF evaluation value remeasuring device 34 determines whether or not a primary AF evaluation value that is obtained in the remeasurement by the AF evaluation value remeasuring device 34 is lower, by a value or more, than a secondary AF evaluation value obtained at a timing of an immediately prior-measurement at the position where the primary AF evaluation value was obtained. Note that this value is to be larger than noise, variation or the like which can be generated when implementing the measurement of the AF evaluation value. If the primary AF evaluation value is not lower, by the value or more, than the secondary AF evaluation value, the process flow returns to step S61. On the contrary, if the primary AF evaluation value is lower, by the value or more, than the secondary AF evaluation value, the process flow proceeds to step S73.

In step S73, the AF evaluation value remeasuring device 34 determines whether or not the measured maximum value has been found in the remeasurement by the AF evaluation value remeasuring device 34. If the measured maximum value is determined to have been found, the lens 21 is moved to a position where the measured maximum value was obtained (step S74), and the series of processes ends (END). When the lens 21 is so moved, the aforesaid correction coefficient is used. On the contrary, if the measured maximum value is determined not to have been found, the process flow proceeds to step S75. The time required for the AF search can be shortened by not continuing the search of the remaining part of the AF search range at the point in time where the measured maximum value was found in this way.

In step S75, the AF evaluation value remeasuring device 34 determines whether or not the movement of the lens in the reverse direction has been carried out a number of times. Namely, whether or not the remeasurement of the AF evaluation value with the lens 21 moved in the reverse direction, which was carried out in step S70, has been carried out the number of times stored in the EEPROM 36 is determined. If the movement of the lens in the reverse direction is determined to have been carried out the number of times, as an error in which the measured maximum value could not be found, the lens 21 is moved to the fixed focal point position (step S76), and the series of processes ends (END). When the lens 21 is so moved, the aforesaid correction coefficient is used. On the contrary, if the movement of the lens in the reverse direction is determined not to have been carried out the number of times, the process flow proceeds to step S80.

In step S80, since even though the lens 21, which is being moved in the reverse direction (that is, in the INF direction), continues to be moved as it is, there exists only a low possibility that the lens 21 can be moved to a position where a higher AF evaluation value is measured, the AF evaluation value remeasuring device 34 changes the driving direction of the lens 21 and then moves the lens 21 in the driving direction (that is, in the N direction) by a number of driving pulses, so as to remeasure an AF evaluation value. When the lens 21 is so moved, the aforesaid correction coefficient is used. Then, in the following step S81, the AF evaluation value remeasuring device 34 determines whether or not an AF re-evaluation value obtained in this additional remeasurement is equal to or larger than the evaluation value threshold. If the AF re-evaluation value is equal to or larger than the evaluation value threshold, understanding that a peak position of the AF evaluation value could be identified, the series of processes ends (END). On the contrary, if the AF re-evaluation value is less than the evaluation value threshold, the process flow proceeds to step S82.

In step S82, the AF evaluation value remeasuring device 34 moves the lens 21 in the driving direction (that is, in the N direction) of the lens 21 by a number of driving pulses so as to remeasure an AF evaluation value. When the lens is so moved, the aforesaid correction coefficient is used. Note that the number of driving pulses used this time is preferably made smaller than the number of driving pluses used in step S20. Then, in the following step S83, the AF evaluation value remeasuring device 34 determines whether or not a primary AF evaluation value obtained in the remeasurement by the AF evaluation value remeasuring device 34 is lower, by a value or more, than a secondary AF evaluation value obtained at a timing of an immediately prior-measurement at the position where the primary AF evaluation value was obtained. If the primary AF evaluation value is determined to be lower, by the value or more, than the secondary AF evaluation value, the process flow proceeds to step S84. On the contrary, if the primary AF evaluation value is determined not to be lower, by the value or more, than the secondary AF evaluation value, the process flow proceeds to step S90.

In step S84, the AF evaluation value remeasuring device 34 determines whether or not the measured maximum value has been found in the remeasurement by the AF evaluation value remeasuring device 34. If the measured maximum value is determined to have been found, the lens 21 is moved to a position where the measured maximum value was obtained (step S85), and the series of processes ends (END). When the lens 21 is so moved, the aforesaid correction coefficient is used. On the contrary, if the measured maximum value is determined not to have been found, the process flow proceeds to step S90. The time required for the AF search can be shortened by not continuing to search the remaining part of the AF search range at the point in time where the measured maximum value was found in this way.

In step S90, the AF evaluation value remeasuring device 34 determines whether or not the movement of the lens in the driving direction has been carried out a number of times. Namely, whether or not the remeasurement of the AF evaluation values with the lens 21 moved in the driving direction which was carried out in steps S80 and S82 was carried out the number of times stored in the EEPROM 36 is determined. If the movement of the lens in the driving direction is determined not to have been carried out the number of times, the process flow returns to step S81. On the contrary, if the movement of the lens in the driving direction is determined to have been carried out the number of times, as an error in which the measured maximum value could not be found, the lens 21 is moved to the fixed focal point position (step S91), and the series of processes ends (END). When the lens 21 is so moved, the aforesaid correction coefficient is used.

Note that steps S20 to S24 in FIG. 4 correspond to the AF evaluation value measuring step, steps S30 to S31 correspond to the return pulse number calculation step, step S40 corresponds to the reverse movement controlling step, step S50 corresponds to the threshold calculation step, steps S60 to S61 correspond to the measurement and determination step, and steps S70 to S74, S80 to S84 and S90 correspond to the AF evaluation value remeasuring step according to the invention. Note that since there exists a variation in luminance in each frame measured by the AF evaluation value measuring device 31 and the AF evaluation value remeasuring device 34 immediately after power supply is introduced into the drive controller 20, steps after step S21 are executed after the variation has become stable.

Figure 5:
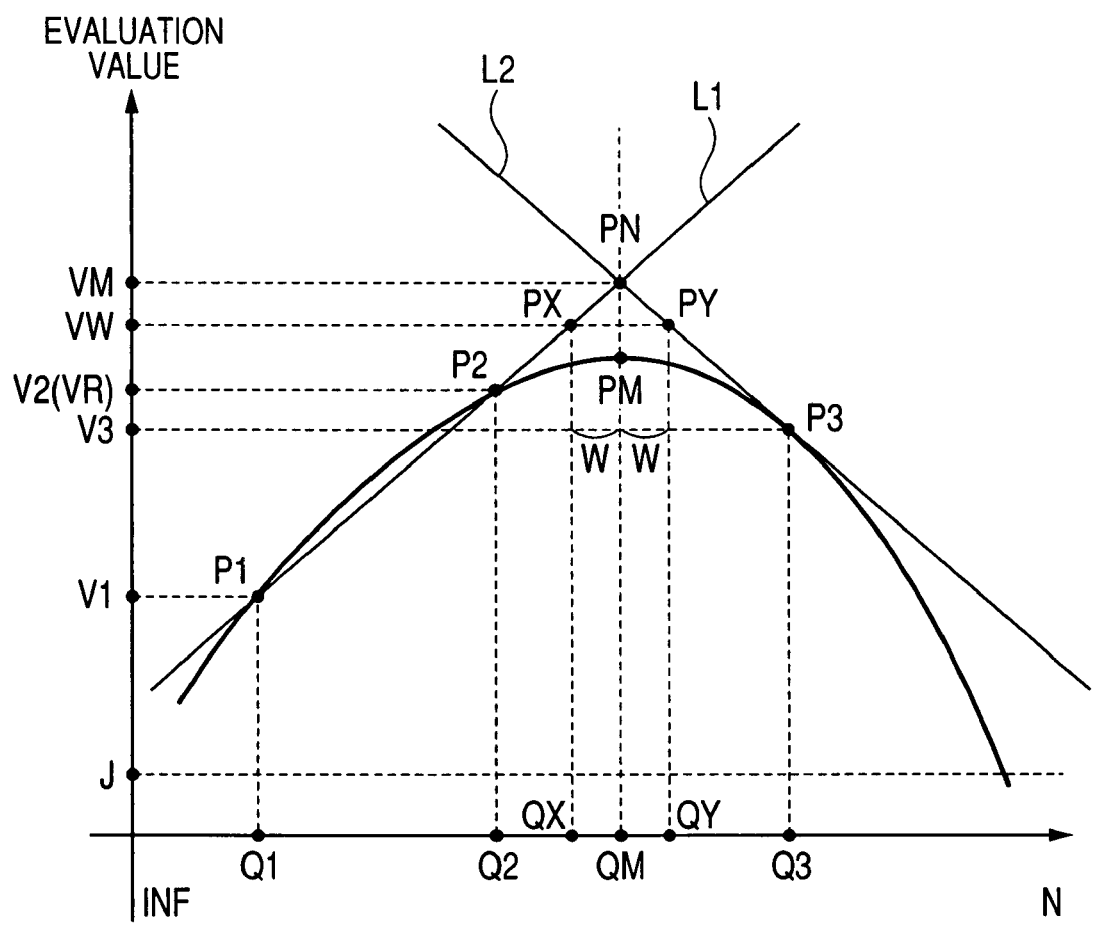
FIG. 5 is a graph showing a relationship between a measured maximum value, an immediately prior-evaluation value, an immediately after-evaluation value and a maximum value-presuming position.

Following this, referring to FIG. 5, an example will be described of a case where the return pulse number calculating device 35 calculates a maximum value-presuming position from the measured maximum value, immediately prior-evaluation value and immediately after-evaluation value through a known interpolation operation. FIG. 5 shows a graph showing a relationship between the measured maximum value, immediately prior-evaluation value, immediately after-evaluation value and maximum value-presuming position. In this graph, an axis of ordinates denotes the magnitude of the AF evaluation value and an axis of abscissas denotes the position of the lens 21. As is shown in FIG. 5, the AF evaluation value measuring device 35 measures, while moving the lens in the driving direction (that is, in the N direction) of the lens 21 by a number of driving pulses for each movement, a AF evaluation value each movement. Measuring points where measurements were made while moving the lens 21 in the N direction are denoted as P1, P2 and P3, respectively. In addition, position of the lens 21 at the respective measuring points are denoted as Q1, Q2 and Q3, respectively. Furthermore, magnitudes of the AF values measured at the respective measuring points are denoted as V1, V2 and V3, respectively. Here, a maximum value of the three AF evaluation values V1 to V3 which were obtained in three or more measurements by the AF evaluation value measuring device 31 is V2, and since this V2 is not such as to be obtained in the first measurement (that is, V1) and in the last measurement (that is, V3), V2 constitutes the measured maximum value in step S23. Because of this, V1 constitutes the immediately prior-evaluation value, and V3 constitutes the immediately after-evaluation value. In addition, as has been described above, in the following step S24, whether or not the obtained measured maximum value V2 is equal to or larger than the effective determination value J is determined. Here, let the measured maximum value V2 be equal to or larger than the effective determination value J.

Here, the return pulse number calculating device 35 calculates a maximum value-presuming position QM from the measured maximum value V2, the immediately prior-evaluation value V1 and the immediately after-evaluation value V3 through a known interpolation operation, calculates a return pulse number which is required to return the lens 21 to the maximum value-presuming position QM and controls the supply of driving pulses based on the return pulse number so calculated in such a way as to return the lens in the reverse direction (that is, in the INF direction) at high speeds. The lens 21 is moved to the maximum value-presuming position (or a position in the vicinity thereof) QM by the control. Note that since the nature of the piezoelectric element is changed by the repetition of moving operation of the lens, there may occur a case where the lens 21 is moved to a position which deviates from the maximum value-presuming position QM. Then, the threshold calculating device 37 calculates an evaluation value threshold VR based on the measured maximum value V2. Here, the evaluation value threshold VR is made to be the measured maximum value V2.

Note that the evaluation value threshold VR is preferably made to be a mean value of the measured maximum value V2 and one of the immediately prior-evaluation value and the immediately after-evaluation value which is not smaller than the other (that is, the immediately after-evaluation value V3 here). In addition, as will be described later on, the evaluation value threshold VR is preferably calculated based on the measured maximum value V2 and one of the immediately prior-evaluation value and the immediately after-evaluation value which is not smaller than the other through interpolation operation (refer to FIG. 6). Additionally, a value which is obtained by multiplying the calculated evaluation value threshold VR by a value stored in the EEPROM 36 (for example, a value resulting by dividing a positive integral number by 1024) may be made to be a new evaluation value threshold VR.

Furthermore, the threshold value calculating device 37 may calculate an interpolated evaluation value VM through a known interpolation operation from the measured maximum value V2, the immediately prior-evaluation value V1 and the immediately after-evaluation value V3 and furthermore, may calculate an evaluation value threshold VW based on the interpolated evaluation value VM so calculated. To describe this more specifically, firstly, the threshold calculating device 37 calculates the interpolated evaluation value VM which is presumed to be a maximum value of the AF evaluation value from the three evaluation values. Namely, the interpolated evaluation value VM is an AF evaluation value obtained at an intersection point of a passing straight line L1 which passes through a point where the measured maximum value V2 is obtained (that is, P2) and a point where the evaluation value of the immediately prior-evaluation value and the immediately after-evaluation value which is not larger than the other (that is P1) and a symmetrical straight line L2 which is transversely symmetrical with the passing straight line L1 with respect to a straight line parallel to the axis of ordinates as an axis of symmetry and which passes through a point where the evaluation value of the immediately prior-evaluation value and the immediately after-evaluation value which is not smaller than the other (that is P3). (The threshold calculating device 37 may calculate this interpolated evaluation value VM as the evaluation value threshold VW.) Here, two positions which are apart a distance W, respectively, from the maximum value-presuming position QM where the interpolated evaluation value VM is obtained, that is, a point which is apart the distance W from QM in the INF direction and a point which is apart the distance W from QM in the N direction are denoted as QX, QY, respectively. Then, the threshold calculating device 37 may calculate an AF evaluation value at the position QX on the passing straight line L1 (that is, an AF evaluation value at the position QY on the symmetrical straight line L2) as the evaluation value threshold VW.

Figure 6:
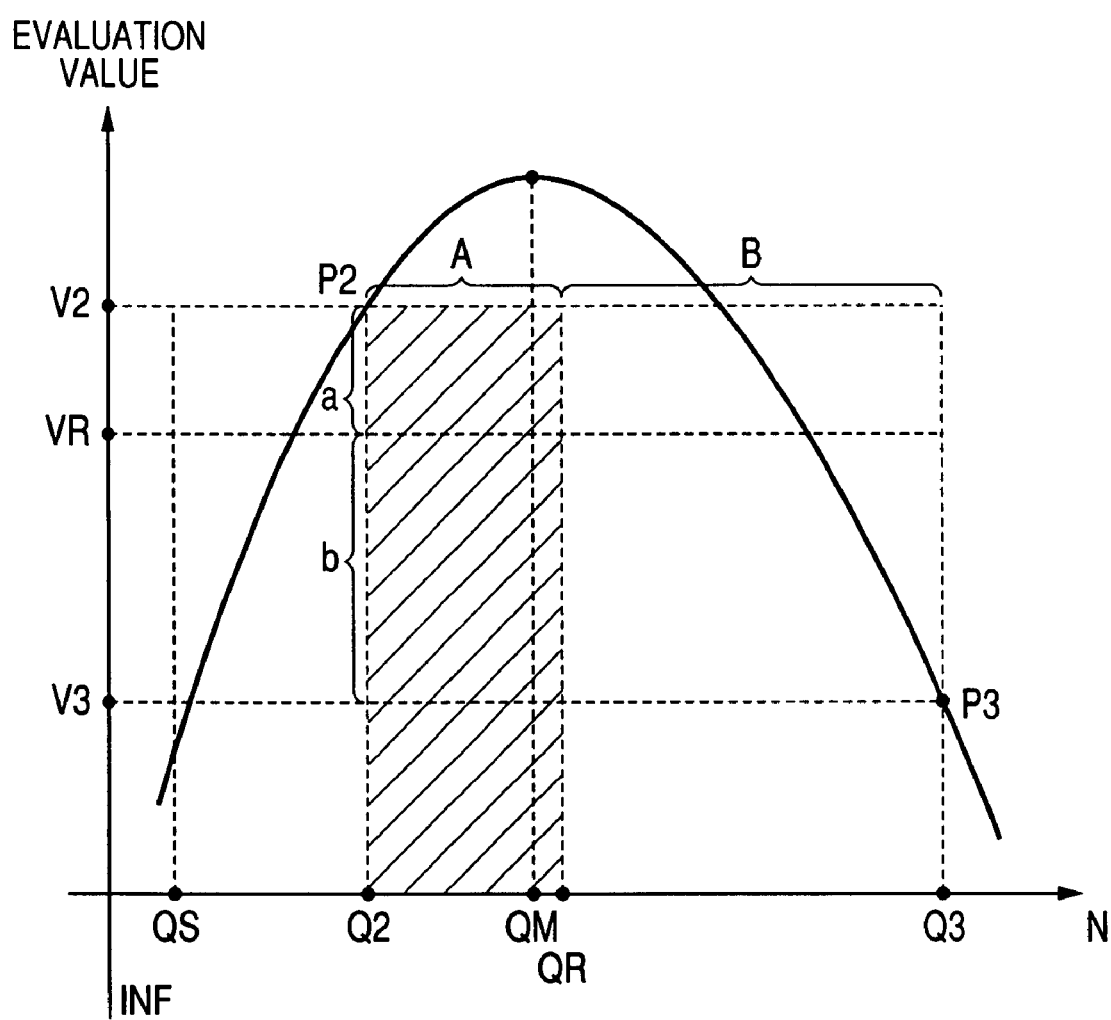
FIG. 6 is a graph showing the relationship between the measured maximum value, the immediately prior-evaluation value, the immediately after-evaluation value and the maximum value-presuming position.

Following this, referring to FIG. 6, an example will be described of a case where an evaluation value threshold VR is calculated from the measured maximum value V2 and one of the immediately prior-evaluation value and the immediately after-evaluation value which is not smaller than the other. FIG. 6 shows a graph showing part of FIG. 5 (parts on the peripheries of P2 and P3) in an enlarged fashion. Assuming that the maximum value-presuming position QM exists within a range which lies within a distance from Q2 which is the position of the measuring point P2, if an AF re-evaluation value is obtained within a range of AF evaluation values which corresponds to this range, understanding that a peak position of the AF value can be identified, the series of processes is completed. Let a position lying away a distance from Q2 in the N direction be QR and a position lying away the distance from Q2 in the INF direction be QS, and if one of the immediately prior-evaluation value and the immediately after-evaluation value which is not smaller than the other is V3, the range lying within the distance means a range lying between Q2 and QR, whereas if one of the immediately prior-evaluation value and the immediately after-evaluation value which is not smaller than the other is V1, the range lying within the distance means a range lying between Q2 and QS.

Here, since one of the immediately prior-evaluation value and the immediately after-evaluation value which is larger than the other is V3, the range lying within the distance means the range lying between Q2 and QR. Here, let a corresponding position in a difference from V2 to V3 which corresponds to the position of QR in a difference from Q2 to Q3 be VR. Namely, a relationship results in which a ratio of a difference A (Q2 to QR) to a difference B (QR to Q3) is equal to a ratio of a difference a (V2 to VR) to a difference b (VR to V3). In addition, the range of AF values which corresponds to the range lying within the distance from Q2 means a range from VR to V2. By this, this VR is understood to be calculated as the evaluation value threshold VR based on the measured maximum value V2 and the evaluation value of the immediately prior-evaluation value and the immediately after-evaluation value which is not smaller than the other. In the step S61, S71 or S81, if the AF re-evaluation value is equal to or larger than this evaluation value threshold VR, understanding that a peak position of the AF evaluation value can be identified, the series of processes may be finished.

As has been described by use of FIG. 5, according to the drive controller 20, the maximum value-presuming position QM is calculated based on the measured maximum value V2, the lens 21 is returned to the maximum value-presuming position QM, the evaluation value threshold VR is calculated based on the measured maximum value V2, and the measurement of the AF evaluation value is implemented until the AF re-evaluation value is determined to be equal to or larger than the evaluation value threshold VR. By this configuration, even in the event that the number of pulses that is required to actually move the lens 21 the specified distance is changed due to the nature of the piezoelectric element 12 being changed by the repetition of moving operation of the lens 21 which is attributed to the usage of the piezoelectric element 12, the lens 21 is returned to the maximum value-presuming position QM or to the vicinity thereof based on the measured maximum value V2, the immediately prior-evaluation value and the immediately after-evaluation value, and the AF evaluation value is remeasured until the AF re-evaluation value is determined to be equal to or larger than the evaluation value threshold VR, whereby an AF search with higher accuracy can be realized.

In addition, in the event that the primary AF evaluation value is lower, by the value or more, than the secondary AF evaluation value, the AF evaluation value remeasuring device 34 of the driving pulse control unit 30 remeasures, while moving the lens 21 in the driving direction (that is, in the N direction) by the number of driving pulses for each movement, an AF evaluation value each movement until the AF re-evaluation value is determined to be equal to or larger than the evaluation value threshold VR. Here, in the event that the primary AF evaluation value becomes lower, by the value or more, than the secondary AF evaluation value, even though the lens 21, which is being moved in the reverse direction (that is, in the INF direction), continues to be moved as it is, there exists only a low possibility that the lens 21 can be moved to a position where a higher AF evaluation value is measured. Since the moving direction of the lens 21 is changed from this presumption so that the lens 21 is then moved in the driving direction (that is, in the N direction) so as to remeasure the AF evaluation value, the lens 21 can be moved to a position where a higher AF evaluation value is measured with less delay. In addition, even though noise of less than a value or the like is generated when the AF evaluation value is measured, the lens 21 can be moved to a position where a higher AF evaluation value is measured until the AF re-evaluation value is determined to be equal to or larger than the evaluation value threshold VR irrespective of generation of the noise or the like.

In addition, the threshold calculating device 37 of the driving pulse control unit 30 calculates the evaluation value threshold VR based on the measured maximum value V2 and the evaluation value of the immediately prior-evaluation value and the immediately after-evaluation value which is not smaller than the other. Next, the measurement and determination device 38 of the driving pulse control unit 30 remeasures, while moving the lens 21 in the reverse direction (that is, in the INF direction) by the number of driving pulses for each movement, an AF evaluation value each movement until the AF re-evaluation value is determined to be equal to or larger than the evaluation value threshold VR. Here, the calculated evaluation value threshold VR is based on not only the measured maximum value V2 but also the evaluation value of the immediately prior-evaluation value V1 and the immediately after-evaluation value V3 which is not smaller than the other. As a result, since the accuracy of the evaluation value threshold VR can be increased further, an AF search with higher accuracy can be realized.

Additionally, the threshold calculating device 37 of the driving pulse control unit 30 calculates the interpolated evaluation value VM from the measured maximum value V2, the immediately prior-evaluation value V1 and the immediately after-evaluation value V3 and furthermore calculates the evaluation value threshold VW based on the interpolated evaluation value VM so calculated. Here, the calculated evaluation value threshold VW is not such as to be based on only the measured maximum value V2 and one of the immediately prior-evaluation value and the immediately after-evaluation value but is based on the interpolated evaluation value VM which is calculated from the measured maximum value V2, the immediately prior-evaluation value V1 and the immediately after-evaluation value V3 through the interpolation operation. As a result, since the accuracy of the evaluation value threshold VW can be enhanced further, an AF search with higher accuracy can be realized.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2006-85946, filed Mar. 27, 2006, the entire disclosure of which is herein incorporated by reference.

What is claimed is:

1. A drive controller comprising:
an electromechanical transducer that extends and contracts along a direction;
a drive member fixed to one end of the electromechanical transducer in the direction; and
a driving pulse control unit that controls a supply of a driving pulse to the electromechanical transducer, the driving pulse control unit causing the drive member to extend and contract along the direction by controlling the supply of driving pulse in such a way as to make an extension speed and a contraction speed along the direction of the electromechanical transducer differ to cause the electromechanical transducer to extend and contract, so as to move a driven member along the direction, the driven member being made to be in frictional engagement with the drive member and including a lens,
wherein the driving pulse control unit comprises:
a AF evaluation value-measuring section that, while the driven member is moved by a number of driving pulses in a driving direction of the driven member during a focusing operation of the lens, measures an AF evaluation value obtained from an image photographed via the lens for each movement of the driven member;
a return pulse number-calculating section that calculates a maximum value-presuming position, which is presumed to be a position where a maximum value of the AF evaluation value is obtained, based on a measured maximum value obtained by the AF evaluation value-measuring section and that calculates a return pulse number to return the driven member to the maximum value-presuming position;
a reverse movement-control section that controls the supply of driving pulses in such a way as to return the driven member in a reverse direction based on the return pulse number;
a threshold calculating section that calculates an evaluation value threshold specifying whether to move the driven member to a preset fixed focus position, based on the measured maximum value;
a measurement and determination section that remeasures an AF evaluation value at a position where the driven member stops after the driven member is returned by the reverse movement-control section and that determines whether the AF evaluation value remeasured is equal to or larger than the evaluation value threshold; and
an AF evaluation value-remeasuring section that, while the driven member is moved in the reverse direction by a number of driving pulses, remeasures an AF evaluation value for each movement of the driven memeber until the measurement and determination section determines the AF evaluation value remeasured to be equal to or larger than the evaluation value threshold.

2. The drive controller according to claim 1, wherein when a primary AF evaluation value obtained by the AF evaluation-remeasuring section is lower, by a value or more, than a secondary AF evaluation value obtained at a timing of an immediately prior measurement at a position where the primary AF evaluation value is obtained, while the driven member is moved in the driving direction by a number of driving pulses, the AF evaluation value-remeasuring section remeasures an AF evaluation value for each movement of the driven member until the AF evaluation value remeasured is determined to be equal to or more than the evaluation value threshold.

3. The drive controller according to claim 1, wherein the threshold calculating section calculates the evaluation value threshold from the measured maximum value, an immediately prior-evaluation value obtained at a timing of an immediately prior measurement at a position where the measured maximum value was obtained and an immediately after-evaluation value obtained at a timing of an immediately after measurement at the position where the measured maximum value was obtained, based on the measured maximum value and one of the immediately prior-evaluation value and the immediately after-evaluation value, which is not smaller than the other.

4. The drive controller according to claim 3, wherein the threshold measuring section calculates an interpolated evaluation value that is presumed to be a maximum value of the AF evaluation value through an interpolation operation based on the measured maximum value, the immediately prior-evaluation value and the immediately after-evaluation value, and the threshold measuring section calculates the evaluation threshold based on the interpolated evaluation value.

5. The drive controller according to claim 2, wherein the threshold calculating section calculates the evaluation value threshold from the measured maximum value, an immediately prior-evaluation value obtained at a timing of an immediately prior measurement at a position where the measured maximum value was obtained and an immediately after-evaluation value obtained at a timing of an immediately after measurement at the position where the measured maximum value was obtained, based on the measured maximum value and one of the immediately prior-evaluation value and the immediately after-evaluation value, which is not smaller than the other.

6. The drive controller according to claim 5, wherein the threshold measuring section calculates an interpolated evaluation value that is presumed to be a maximum value of the AF evaluation value through an interpolation operation based on the measured maximum value, the immediately prior-evaluation value and the immediately after-evaluation value, and the threshold measuring section calculates the evaluation threshold based on the interpolated evaluation value.

* * * * *